US010826844B2

(12) United States Patent
Summers et al.

(10) Patent No.: US 10,826,844 B2
(45) Date of Patent: Nov. 3, 2020

(54) TRANSMISSION OF TAGS AND POLICIES WITH DATA OBJECTS

(71) Applicant: Amazon Technologies, Inc., Reno, NV (US)

(72) Inventors: Carl Wesley Summers, Bainbridge Island, WA (US); Syed Omair Zafar Gillani, Issaquah, WA (US); Jonathan Jorge Nadal, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 571 days.

(21) Appl. No.: 14/870,627

(22) Filed: Sep. 30, 2015

(65) Prior Publication Data

US 2017/0093753 A1    Mar. 30, 2017

(51) Int. Cl.
*H04L 12/927* (2013.01)
*G06F 21/62* (2013.01)
*H04L 12/911* (2013.01)
*H04L 29/08* (2006.01)
*H04L 29/06* (2006.01)

(52) U.S. Cl.
CPC ........ *H04L 47/808* (2013.01); *G06F 21/6218* (2013.01); *H04L 47/72* (2013.01);
(Continued)

(58) Field of Classification Search
CPC ....... H04L 47/808; H04L 47/72; H04L 67/10; H04L 47/828; H04L 63/10; H04L 63/102;
(Continued)

(56) References Cited

U.S. PATENT DOCUMENTS 8,176,283 B1    5/2012   Hanson et al.
9,083,749 B1    7/2015   Roth et al.
(Continued)

FOREIGN PATENT DOCUMENTS

CA    2998685        4/2017
EP    0715243 A1 *  6/1996   ............. G06F 21/10
(Continued)

OTHER PUBLICATIONS

Ben-Johan van der Walt; How to copy or move objects from one S3 bucket to another between AWS Accounts—Part 2; Jan. 7, 2015; URL:http://blog.vizuri.com/how-to-copy/move-objects-from-one-s3-bucket-to-another-between-aws-accounts.*
(Continued)

*Primary Examiner* — Patrice L Winder
*Assistant Examiner* — Aye M Aung
(74) *Attorney, Agent, or Firm* — Hogan Lovells US LLP

(57) ABSTRACT

Information for a data object can be prevented from loss for import and export operations across a trust boundary, such as may exist between environments under control of different legal entities. A set of dependencies, including information such as data tags and identifiers for applicable policies, can be embedded in a data object, such as directly in a header or in a digest or token of the data object. When the data object is transmitted across a trust boundary, such as to a destination bucket, the destination bucket can ensure that all dependencies are available and able to be enforced in the destination environment. If not, the request can be denied or the destination environment can contact the source environment to attempt to obtain and enforce the missing dependencies. At least some of the dependencies may also need to be transformed in the second environment.

20 Claims, 8 Drawing Sheets

(52) U.S. Cl.
CPC .............. *H04L 67/10* (2013.01); *H04L 67/42* (2013.01); *G06F 2221/2141* (2013.01)

(58) Field of Classification Search
CPC ..... H04L 67/42; H04L 12/1432; H04L 43/08; H04L 63/108; H04L 63/123; G06F 21/6218; G06F 2221/2141; G06F 9/468; G06F 21/6227; G06F 21/64
See application file for complete search history.

(56) References Cited

U.S. PATENT DOCUMENTS

| | | | | |
|---|---|---|---|---|
| 2003/0074367 | A1* | 4/2003 | Kaler | H04L 45/34 |
| 2004/0117655 | A1* | 6/2004 | Someshwar | H04L 63/0227 726/1 |
| 2007/0162749 | A1* | 7/2007 | Lim | G06F 21/6227 713/167 |
| 2008/0109620 | A1* | 5/2008 | Nabekura | G06F 3/0647 711/162 |
| 2014/0101005 | A1* | 4/2014 | Baset | G06Q 10/10 705/30 |
| 2016/0044040 | A1* | 2/2016 | Caffary, Jr. | G06F 21/6218 726/4 |
| 2017/0339069 | A1* | 11/2017 | Larsson | G06F 9/5061 |

FOREIGN PATENT DOCUMENTS

| | | | | |
|---|---|---|---|---|
| EP | 0715243 | B1 * | 8/2003 | G06F 21/10 |
| EP | 3356989 | | 8/2018 | |
| IN | 201817013923 | | 8/2018 | |
| WO | 2017/059077 | | 4/2017 | |

OTHER PUBLICATIONS

Ben-Johan van der Walt; How to copy or move objects from one S3 bucket to another between AWS Account—Part 2; Jan 7, 2015; URL:http://blog.vizuri.com/how-to-copy/move-objects-from-one-s3-bucket-to-another-between-aws-accounts.*

Amazon Simple Storage Service, Developer Guide, API version; Mar. 1, 2006.*

Ben-Johan van der Walt; How to copy or move objects from one S3 bucket to another between AWS Accounts—Part 2; Jan 7, 2015; URL:http://blog.vizuri.com/how-to-copy/move-objects-from-one-s3-bucket-to-another-between-aws-accounts (Year: 2015).*

Amazon Simple Storage Service, Developer Guide, API version; Mar. 1, 2006 (Year: 2006).*

Office Action issued in European Application No. 16785278.9 dated Feb. 20, 2019.

Office Action issued in Canadian Application No. 2,998,685 dated Nov. 19, 2019.

"International Search Report and Written Opinion dated Jan. 29, 2017" received in PCT/US2016/054458.

Ben-Johan Van Der Walt: "How to Copy or Move Objects from one S3 bucket to another between AWS Accounts—Part2", Jan. 7, 2015 (Jan. 7, 2015), XP055335126, Retrieved from the Internet: URL: Http//blog.vizuri.com/how-to-copy/move-objects-from-one-s3-bucket-toanother-between-aws-accounts [retrieved on Jan. 13, 2017] p. 1-p. 7.

"Amazon Simple Storage Service—Developer Guide—API Version Mar. 1, 2006", Dec. 31, 2014 (Dec. 31, 2014), XP055252318, Retrieved from the Internet: URL:http://awsdocs.s3.amazonaws.com/S3/200/60301/s3-dg-20060301.pdf [retrieved on Feb. 23, 2016] p. 3, p. 263-p. 267.

"International Report on Patentability dated Apr. 12, 2018" received in PCT/US2016/054458.

"Communication pursuant to Rules 161(1) and 162 EPC dated May 14, 2018" received in EP16785278.9-1213.

Canadian Examiner's Report issued in corresponding Canadian Application No. 2998685 dated Nov. 27, 2018.

Summons to Attend Oral Proceedings issued in European Application No. 16785278.9 dated Aug. 27, 2019.

* cited by examiner

TRANSMISSION OF TAGS AND POLICIES WITH DATA OBJECTS

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A customer typically will rent, lease, or otherwise pay for access to resources through the cloud, such that the customer does not have to purchase and maintain the hardware and/or software to provide access to these resources.

In many instances, a customer will want to be able to ensure that certain policies are enforced on certain types of data, and may want to tag different data instances to ensure that the applicable policies are associated with that data. While the policies and tags for an instance of data can be enforced within a trust boundary, such as within a portion of an environment associated with a customer account, the policies and tags can be lost or disregarded when that data is transmitted across or outside the trust boundary. A customer may then be hesitant to transmit the data, or utilize the environment, due to the inability to enforce the polices and tags once the data crosses the trust boundary.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to managing access to, and usage of, data in an electronic environment. In particular, various embodiments enable dependencies, such as tags and policy identifiers, to be embedded in a data object. This can include, for example, placing tags (i.e., key-value pairs for data categorization) and policy identifiers in headers of the data object, encoding these dependencies in a digest placed in a header of the data object, or embedding these dependencies in an opaque token of the data object, among other such options. Any entity having access rights to the data object can have to agree to enforcement of policies associated with the data object. If the data object is transmitted across a trust boundary between customer accounts, the resources in the various accounts can have access to shared policies for the customer such that the data object with tags and policy identifiers can be stored to the other customer account bucket, for example, with any transformation of the tags, digest, or policy identifiers performed as appropriate for that account environment. If the data object is to be transferred to a different customer environment, or outside the provider environment, the requesting resource must have a copy of any required policies for the data object and be able to enforce those policies in order to be able to accept the data object. If the receiving environment does not have a copy of a relevant policy, the environment can request a copy of the policy, and ensure that the environment is able to enforce the policy, in order to accept the data object. The tags, digest, policy, and/or policy identifier can be transformed as appropriate for the receiving environment.

Various other applications, processes, and uses are presented below with respect to the various embodiments.

Figure 1:
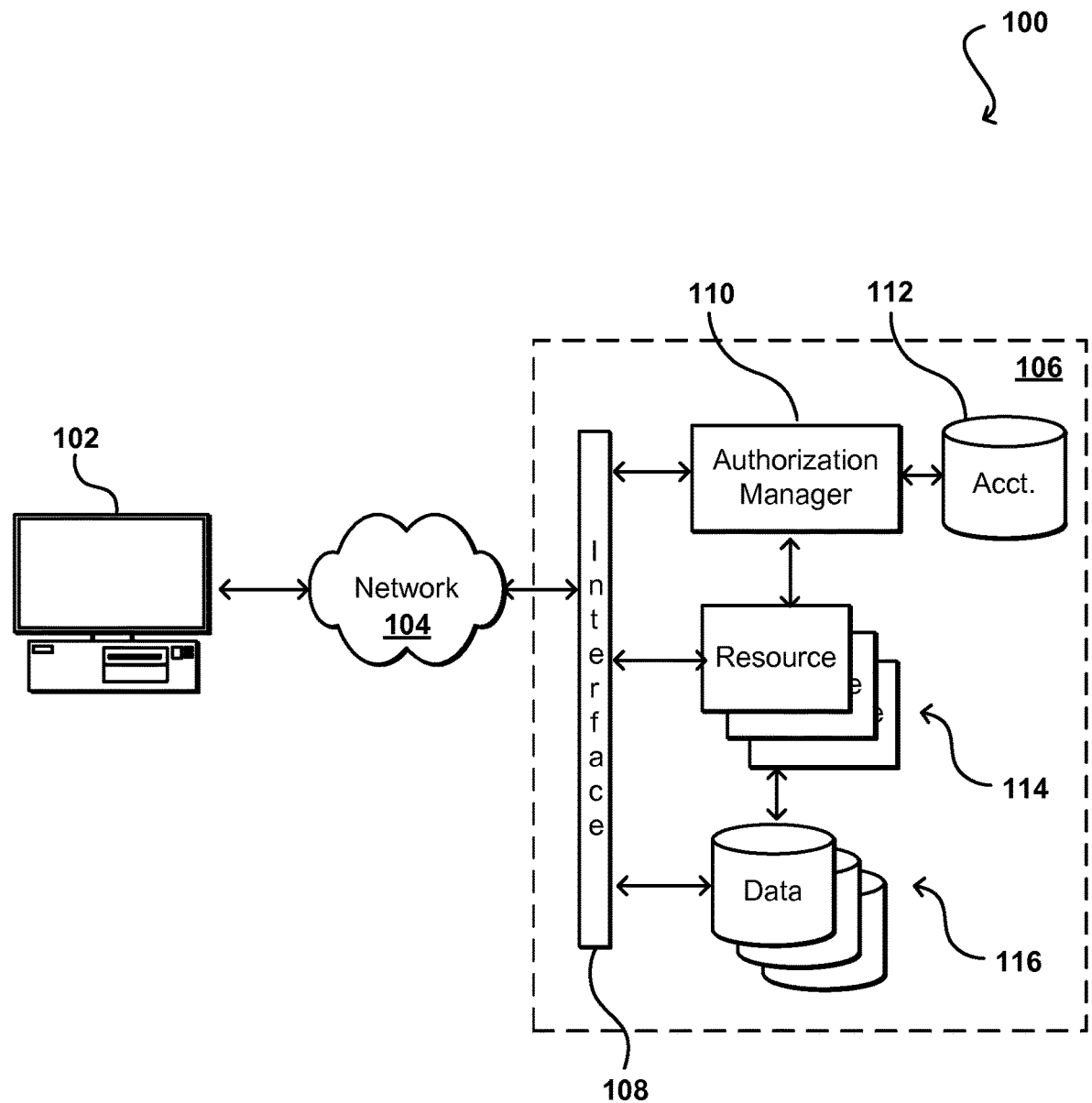
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager, authorization manager 110, or other such system, service, or component configured to manage user accounts and information. A component such as a resource manager can also handle tasks such as resource provisioning and usage, and other such aspects. An authorization manager 110 receiving information for the request can perform tasks such as to authenticate an identity of the user submitting the request, as well as to determine whether that user has an existing account with the resource provider, where the account data may be stored in at least one account data store 112 or other such repository in the provider environment. A user can provide any of various types of credentials in order to authenticate an identity of the user to the provider. These credentials can include, for example, a username and password pair, biometric data, a digital signature, or other such information. The provider can validate this information against information stored for the user in the account data store 112. If the user has an account with the appropriate permissions, status, etc., information can be passed to the resource manager, which can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager, at least until such time as a relevant aspect of the user account changes, the user is no longer granted access to the resource, or another such aspect changes.

The resource manager (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 2:
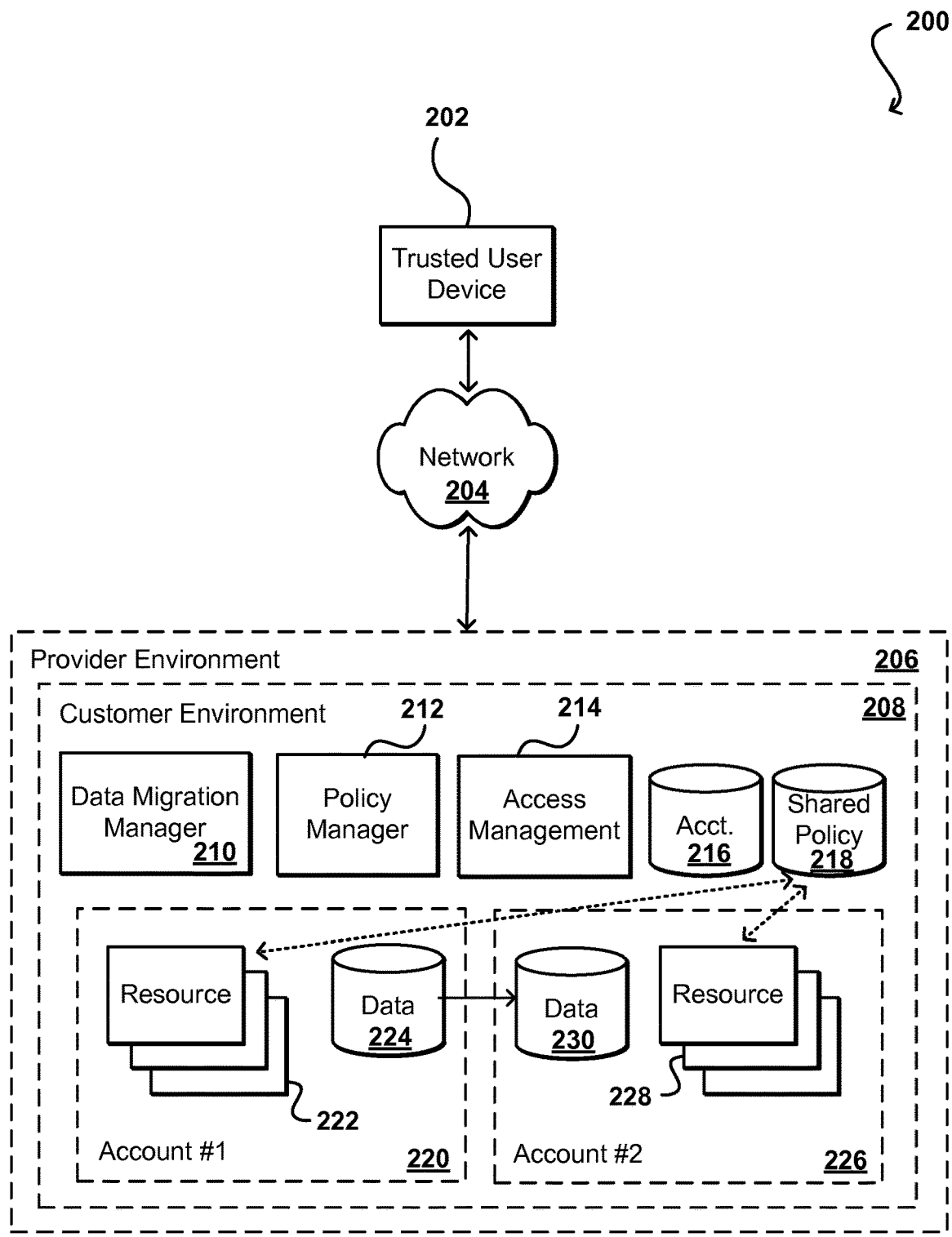
FIG. 2 illustrates an example configuration wherein a data object is to be transmitted across a trust boundary between customer accounts that can be utilized in accordance with various embodiments.

As mentioned, a customer of such a resource environment might have data that is stored by data storage devices in the resource provider environment 206, such as the data stores 224, 230 illustrated in the example environment 200 of FIG. 2. In this example, a customer has multiple accounts with the resource provider, such that there can be different account environments 220, 226 set up within an overall customer environment 208. Each environment can include a set of physical and/or virtual resources, and can store data according to various rules or policies established for that environment. Trust boundaries thus exist between the two account environments 220, 226, as well as between the customer environment 208 and the rest of the provider environment 206. In some embodiments there may be trust boundaries between each account environment 220, 226 and the rest of the customer environment 208 as well. Different accounts might exist for a corporation, for example, where those accounts might correspond to different divisions, departments, groups, or other such sub-entities. The data stored within a trust boundary can be processed using various resources 222, 228 (e.g., physical or virtual servers) of the respective environment 220, 226. The data can be managed using various policies that can be administered by a policy manager 212 and stored in a policy database 218 or other such location within the customer environment. A policy manager in general can refer to a system, service, or component that performs tasks such as creating policies, associating policies with objects, maintaining the associations, providing access to policies, and other such tasks. As used and discussed elsewhere herein, a policy refers to an action that is able to be performed based upon a tag, lifecycle operation, related resource, or other such cause, source, or trigger, among other such options. Customers can write or select policies wherein specific actions will be performed for data objects having certain tags assigned. Different tags and policies might be utilized for each account environment 220, 226. It should be noted that "trust boundary" as used herein refers to any separation, physical and/or logical, of resources, data, or other objects or components that are under at least partial control of different entities (i.e., legal entities), whereby one entity does not have full control over the resources, etc., on the other side of the trust boundary. This can include boundaries between different networks, as well as logical boundaries within a common network, among other such configurations.

Because both customer account environments 220, 226 are within the customer environment 208, shared components can be placed in the customer environment in a location (physically and/or logically) that is considered to be outside either account environment or a part of each account environment. In this way, the resources 222, 228 and data stores 224, 230 of each account environment can have access managed by a common access management component 214 using data from a shared account data repository 216, and can have policies enforced by a policy manager 212 using a shared policy repository 218. It should be understood that in some embodiments any or all of the elements in the customer environment but outside the account environments could be contained within the resource provider environment as well. An advantage of having components such as a policy manager 212 and an access management component 214 is that the account environments can share these resources, reducing the amount of overhead needed to support the separate account environments 220, 226. Further, policies only have to be defined once for a legal entity, for example, and are not tied to specific resources or accounts, etc. A legal entity as used herein refers to an entity that has capacity to enter into agreements and assume obligations, such as a corporation, partnership, or individual with such legal standing. An enterprise having multiple accounts can have the policy defined once for the enterprise, and the policy can then be applied across the various accounts of the enterprise.

Another advantage of the shared components is that a policy only has to be established and stored once within the customer environment 208. A resource 228 of the second account environment 226 might want to obtain a copy of a data object stored in a data store 224 within the first account environment 220. Since these are separate environments, an owner of the first account environment 220 will want to ensure that any tags and policies applied to the data object remain with the data object when passing across the trust boundary between the two environments 220, 226. In various embodiments, tags associated with a data object can be embedded in the object such that the tags move with the data object across the trust boundary. The data object can also include at least one pointer or identifier for an appropriate policy for the data object, where that pointer or identifier can also move with the data object. In some embodiments the tags and policy identifiers can be embedded in headers of the data object. The tags and policies, also referred to herein as dependencies, can also be encoded into a digest that can be embedded in a header of the data object. In this way, the resources 222 of the first account environment can be sure that the dependencies will not get lost during the transmission of the data object from the first environment data store 224 to a data store 230 of the second account environment.

Since the account environments are both associated with the same customer, the environments can both leverage the same policy manager 212 and policy repository 218. Thus, the policies do not have to move with the data objects as they pass between the account environments 220, 226, but can remain in the shared repository 218. It is possible, however, that the environments will have different policy languages, components, protocols, standards, or other such factors that may result in different expressions or forms of the various tags, policies, digests, and/or policy identifiers. Accordingly, the dependencies may have to undergo a transformation before the data object is able to be stored in, or accessible in, the second account environment 226. This can include, for example, a different encoding of a digest, as may point to different data categorizations for tags or other such differences. The migration of the data and transformation of dependencies can be handled by resources 228 in the second account environment in some embodiments, while a component such as a data migration manager 210 may be used in other embodiments to ensure that the data object is copied over only if the dependencies are supported and any transformations able to be completed as necessary.

The trigger for the transmission of the data object from the first account environment 220 to the second account environment 226 can be, for example, a GET call to an appropriate API from a resource 228 of the second account environment 226 or a PUT call to an appropriate API from a resource 222 of the first account environment 220. The trigger can also be a transmission request received from a trusted user device 202, or device of a trusted user, that can be submitted across at least one network 204 to the provider environment. The trusted user can be associated with the customer, for example, or can be a third party user who has access rights verified through the access management component 214 or another such system or service.

Figure 3:
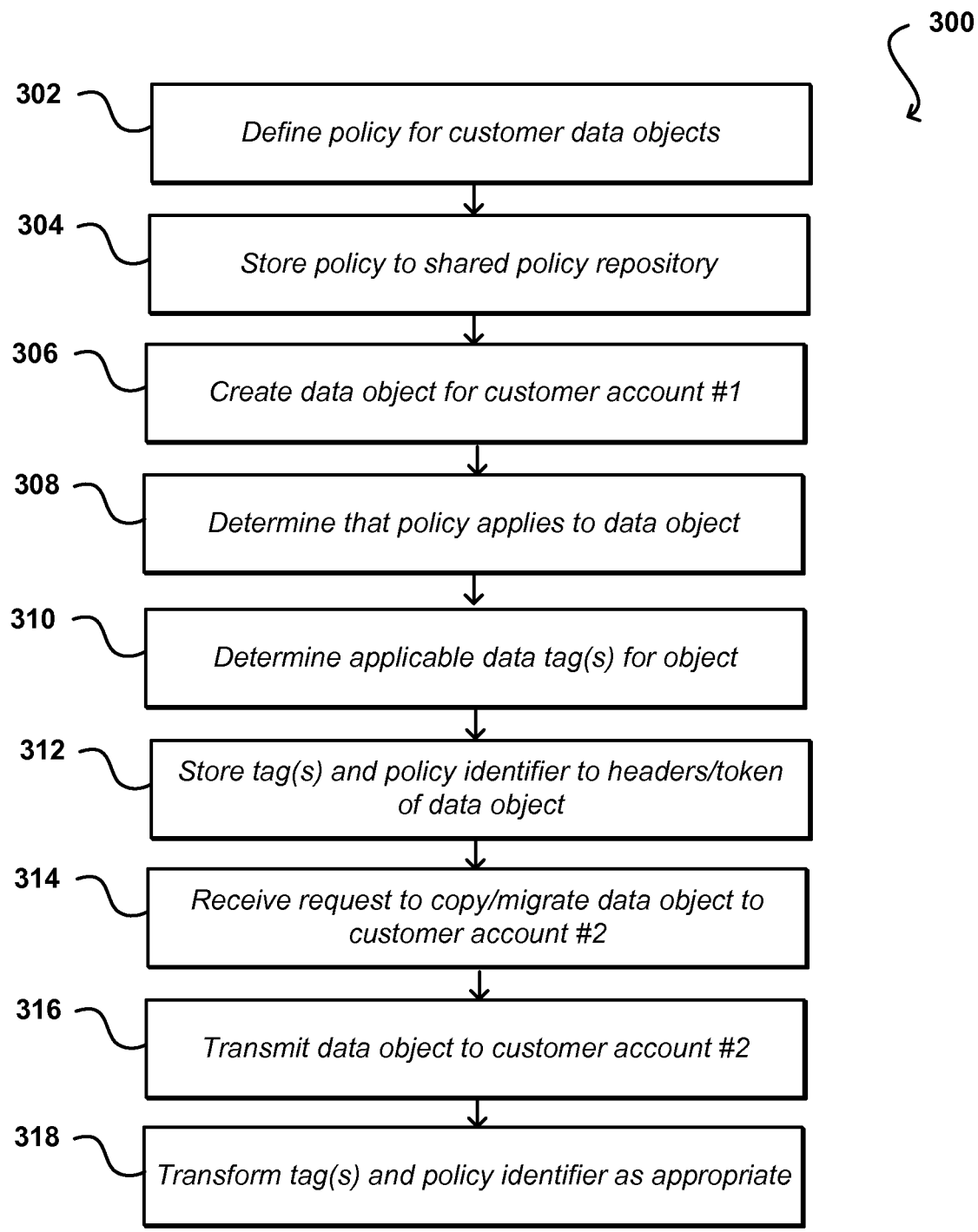
FIG. 3 illustrates a process for transmitting a data object across a trust boundary between customer accounts that can be utilized in accordance with various embodiments.

FIG. 3 illustrates an example process 300 for transmitting a data object between environments associated with a common entity, such as those illustrated in FIG. 2, that can be utilized in accordance with various embodiments. It should be understood that, for any process discussed herein, additional, fewer or alternative steps can be performed in similar or alternative arrangements, or in parallel, within the scope of the various embodiments unless otherwise specifically stated. In this example process, a policy is defined 302 (through creation or specification of a policy, for example) to be used for data objects associated with a customer of a resource provider environment, or other such entity. The policy can be any appropriate policy, such as a bucket policy or authorization policy, among other such options. Since the customer has separate account environments within the overall customer environment, the policy can be stored 304 to a shared policy repository in the customer environment (or elsewhere accessible from within the provider environment). When a data object is created 306 for a first customer account, it can be determined 308 that the policy should apply to the data object. It can also be determined 310 that there are applicable data tags for the data object. In some embodiments, the tags are data categorization tags that are selected based at least in part upon some aspect of the data contained within the data object, and the applicable policies can depend at least in part upon the tags specified for the data object. The tags and an identifier or pointer for the policy can then be stored 312 with the data object, such as in one or more headers of the data object or in a token or digest stored to the data object, among other such options. As mentioned, the policy identifier can point to the policy in the shared data repository.

Subsequently, a request can be received 314 to transmit the data object (or a copy of the data object) across a trust boundary to a second account environment associated with the same customer. As mentioned, this can take the form of a GET and/or PUT request, among other such options. In this example the request is received from a resource of the second account environment. In response to the request, the data object can be transferred 316 to the second account environment. Various intermediate steps may need to be performed in at least some embodiments, as may include one or more authorization, authentication, or other such steps to ensure that the resource of the second account environment has access rights to the data object. As mentioned, access rights in some embodiments are only granted in response to verifications or certifications that an entity or environment will enforce the tags and policies associated with data objects received from the granting entity or environment. The tags and other dependencies will be included in the data object, and the second account environment will have access to the policy from the shared policy repository of the customer environment. As such, the tags and policies will remain with the data object as that data object is transmitted across the trust boundary between the environments. The policy identifiers, tags, policies themselves, and/or other dependencies can be transformed 318 in the second account environment as appropriate, such as by using a different encoding on a digest or updating a pointer according to a naming or mapping convention, among other such options. Transformation can be important not only for different technologies or protocols used in different environments, but also to minimize the likelihood of conflicts. Since tags in at least some embodiments are key value pairs, where the key might be the department and the value might be human resources or finance, for example, it is possible that different environments might use the same tag for different things that the respective owners may define. Accordingly, part of the transformation process may involve determining the presence of potential conflicts and adjusting the key, value, or definition associated with one or more tags or policies associated therewith. As mentioned elsewhere herein, copies of the policies, tags, or other dependencies might be retained by a resource or an environment for at least a determined period of time. If the resource then receives a request for a dependency from another environment, for example, the original version of the dependency, at least the version as was received to the environment as well as the transformed version can be provided in at least some embodiments. While an original policy may not have been appropriate for the current environment, for example, the original policy may be more appropriate or understandable in the requesting environment. In some embodiments, it may be preferable to transfer only the original version of the policy and let each environment transform as necessary, in order to prevent modifications from being propagated that, upon transformation, could potentially alter the action taken under the modified policy.

As mentioned, tags can be associated with data objects in some embodiments based at least in part upon one or more data categorizations. The ability to categorize data enables data management based on factors such as compliance requirements, information technology (IT) governance, and security policies that apply for a given user (i.e., enterprise). For example, a user can categorize a set of data as "log" data.

The user can then manage all data that falls within this category using a specified set of policies. Data categorized in a separate category, such as "financial critical" data, may be subject to a different set of management policies, as may be specified by contract or otherwise. Customers can be provided with the ability to tag and classify data using set or custom tags. Any given object stored in the resource provider environment can have one or more tags applied. In various embodiments, data object tags can be of two types: mutable and immutable. Mutable tags can be changed at any time during the lifecycle of a data object, with access being controlled (i.e., only federated identities or other authorized identities can have access to edit or change a tag). Immutable tags cannot be removed from a data object or changed once applied to a data object. Object tag access can be controlled by a data manager, for example, and similar components in other environments, such that only authorized users or groups can edit tags.

A policy manager can include, or work with, a policy evaluation engine. A policy evaluation engine can include hardware and/or software configured to take information from a request and from one or more corresponding policy documents and determine how to handle the request, such as whether to allow, deny, or audit the request. In at least some embodiments, a customer can submit a policy to an entity such as an access management service, which can cause that policy to be available to one or more evaluation engines that can use that policy to, for example, determine whether to allow or deny access to resources or services associated with that customer. The resources and/or services can be located at various locations across a distributed environment, and one or more evaluation engines can be utilized for at least some of these locations. As mentioned, different evaluation engines might require different versions of a policy, such that a transformation may be needed in some embodiments. In one example, a policy manager can translate a policy to at least one representation that is supported by those evaluation engines. This can include, for example, translating the policy to an earlier version of the policy language, which can support similar functionality but with potentially more complex constructs. The policy representation(s) can be sent to locations where the representations are accessible to the respective evaluation engine(s). The policy representations can be applied to various resources or components in the distributed environment, as may include buckets, queues, data stores, processing components, servers, virtual machines, or other such components.

As mentioned, approaches in accordance with various embodiments enables policies to be encoded within calls, such as API calls for GET and PUT operations that may cause a data object to be transmitted across one or more trust boundaries. Such approaches ensure that the policies remain with the data and are not accidentally dropped during the transmission, and can ensure that the proper level of enforcement is obtained on the other side of the trust boundary. The call can be initiated by a trusted party, and in at least some embodiments the arrangement is such that the trusted party upon agreeing to receive access rights is also agreeing to enforce the policies.

In an example use case, a tag can be applied to a data object in order to provide some categorization for the data. This can be additional information about the data as well as standard categorization information, such as may specify business critical data, confidential data, or data subject to a legal hold. An owner of a data object in a first environment might set a tag such as legal_hold=true in order to place a legal hold on the data object. By placing that tag on the data object, the owner can ensure that the data object will be subject to a policy that the owner has defined for a legal hold. As an example, the policy could indicate that access is revoked from all but three users from the legal department or who are otherwise authorized to have access to this data object. In the case of an audit, for example, a legal hold might be placed on specific data to ensure that no changes or deletions occur with respect to that data, and the data can only be viewed by the authorized users. And since the tags and policy identifiers will move with the data, the access cannot be changed simply by moving the data object across a trust boundary to another trusted environment. Moving the data to a different bucket will not affect the access rights as the same tags and policies will apply, and any conflicts can be resolved. For example, a "legal_hold=true" tag might provide access to different people in different environments, so a transformation might adjust the key value of the tag or take another such action. Enforcement capability then is not lost through transmission or replication.

In another use case, a customer might want to have copies of a data object in at least two different regions for data redundancy, disaster recovery, or other such reasons. The customer might assign a legal hold tag in a first bucket storing the data object. The customer can then request to PUT the data object to a different account environment for the customer, whereby the data and policy pointers can move with the data object and the policies will be shared across both environments. This ensures that the policies will be enforced in both locations. As mentioned, in order to ensure that the dependencies are not lost during transmission an opaque token or digest can be included with the data object, such as may be generated by a Web server or other such component. The destination server will expect the presence of that token, and the PUT request will be failed if the expected token is not present with the request. The receiving server can also digest all the dependencies for the data object to ensure that none of the dependencies were mutated or otherwise affected by the transmission across the trust boundary. In some embodiments the tags can be included as a header and the tag digests included as a header that can then be checked against each other to ensure that no modifications or omissions occurred. The tag data, digest, and any metadata to be kept with the data object can be embedded in an opaque token as well in some embodiments.

Figure 4:
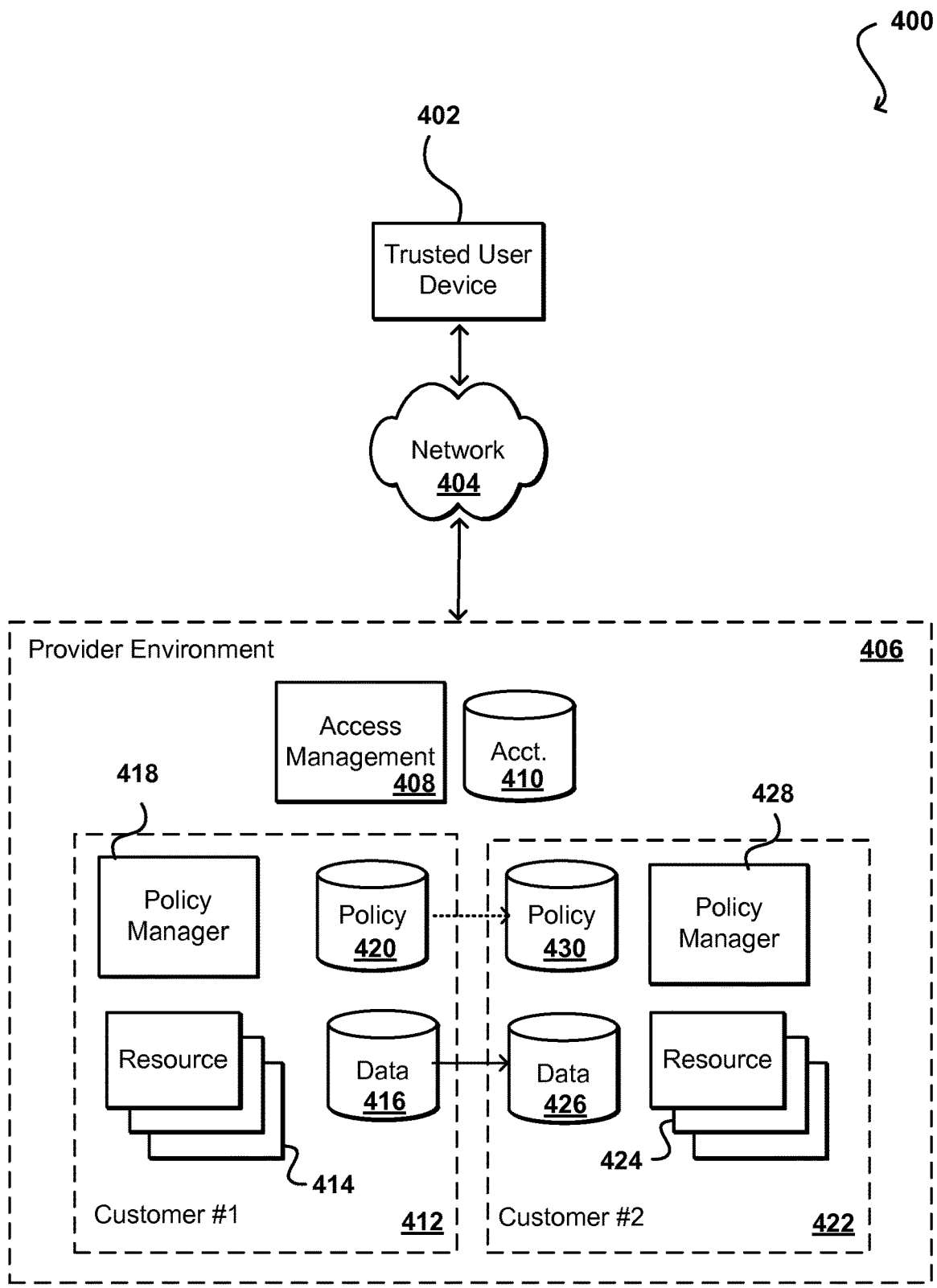
FIG. 4 illustrates an example configuration wherein a data object is to be transmitted across a trust boundary between customer environments that can be utilized in accordance with various embodiments.

FIG. 4 illustrates another example environment 400 in which aspects of the various embodiments can be practiced. In this example a trusted user device 402 can again make calls across at least one network 404 to be received by a resource provider environment 406. The resource provider environment can have an access management component 408 that can check information for the user request against an account data store 410, or other such repository, in order to authenticate and/or authorize the request. In this example the provider environment 406 again includes two sub-environments, but in this case the environments below to different customers or legal entities. A first environment 412 has resources 414 and data stores 416 for a first legal entity, and the second environment 422 has resources 424 and data stores 426 for a second legal entity. In this example, each environment has its own set of policies stored by a respective policy repository 420, 430 and managed by a respective policy manager 418, 428.

Figure 5:
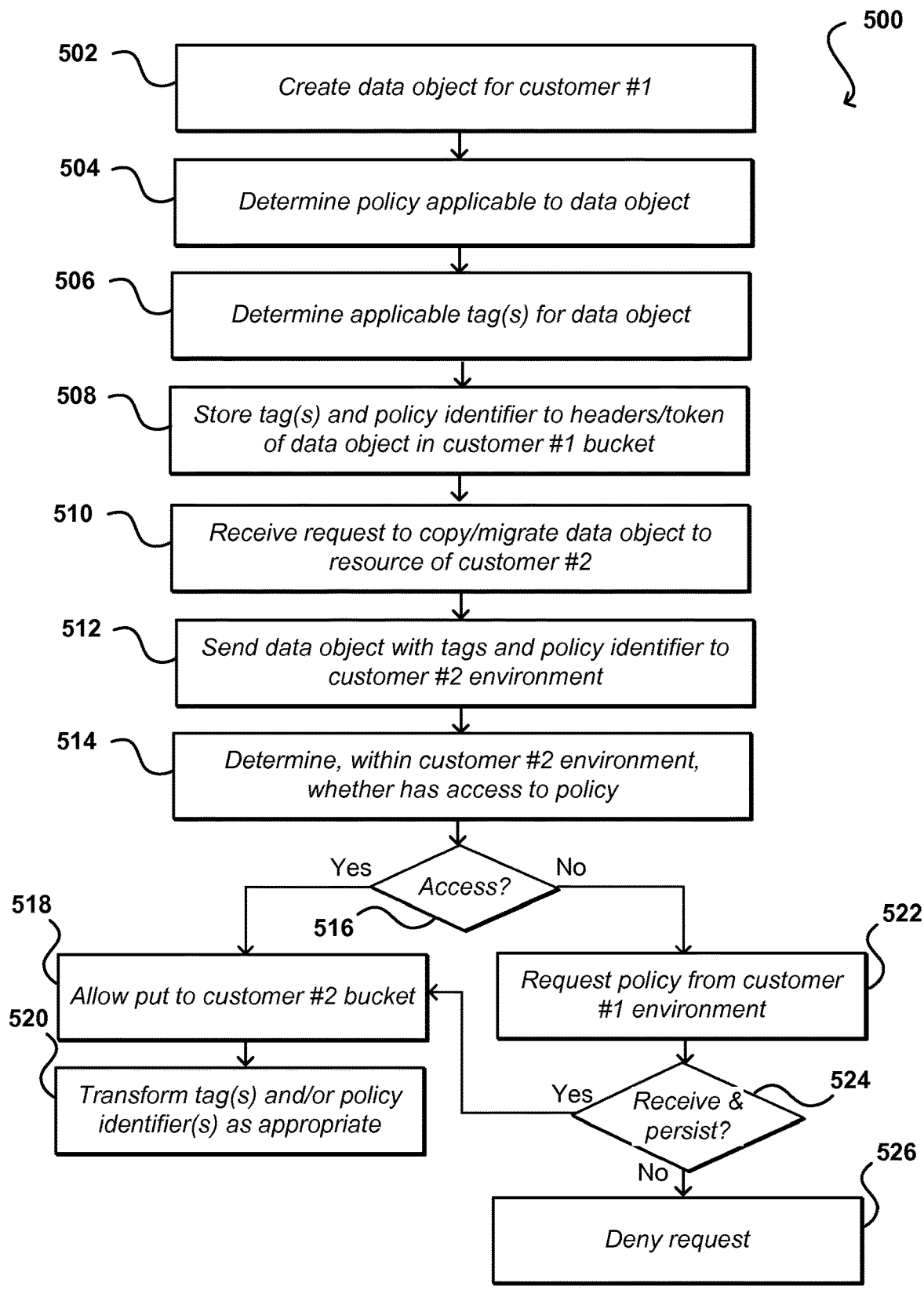
FIG. 5 illustrates a process for transmitting a data object across a trust boundary between customer environments that can be utilized in accordance with various embodiments.

Because the environments belong to separate legal entities, and the policies are not shared across the trust boundary there between, the policies will have to move with the data. FIG. 5 illustrates an example process 500 for transmitting data in such a situation that can be utilized in accordance with various embodiments. In this example, a data object is created 502 for a first customer in the first environment, and an applicable policy for the data object is determined 504. This can include defining a new policy or pointing to an existing policy, among other such options. Any applicable tag(s) for the data object can also be determined 506 as discussed herein. The data object, along with the tag(s) and policy identifier(s) can then be stored 508 in a first bucket or other location within the first environment. A request or call can subsequently be received 510 to cause the data object, or a copy of the object, to be transmitted to a second environment, associated with a second legal entity, as part of a copy or migration process. In this example, the trusted nature of the second environment enables the data object to be transmitted 512 to the second environment. Within the second environment, it can be determined 514 whether the environment has access to the policy, as well as whether any tampering, modification, or loss of the dependency information occurred during the transmission. If the second environment has access 516 to, and can enforce, the policy on the data object, and no modification is determined to have occurred, the data object can be allowed 518 to be put to the second bucked in the second environment. Any transformation of the tag(s) or policies for the object can also be performed 520 as discussed and suggested herein. If the second environment does not have access to the policy, as may be listed in the digest of the data object, for example, a resource of the second environment can request 522 a copy of the policy from the first environment. If the policy is successfully received 524, persisted, and able to be enforced in the second environment (i.e., does not conflict with any other policies) then the data object can be allowed to be put to the second bucket as discussed previously. If the second environment is not able to receive and enforce the policy, then the request can be denied 526.

In some embodiments a call for a data object can result in a digest for the data object being transmitted to the target environment. The target environment can then analyze the digest and determine whether the environment can enforce all tags and policies for the data object. If some are missing, the second environment can either deny the transmission or can request the missing tags or policies, etc.

Figure 6:
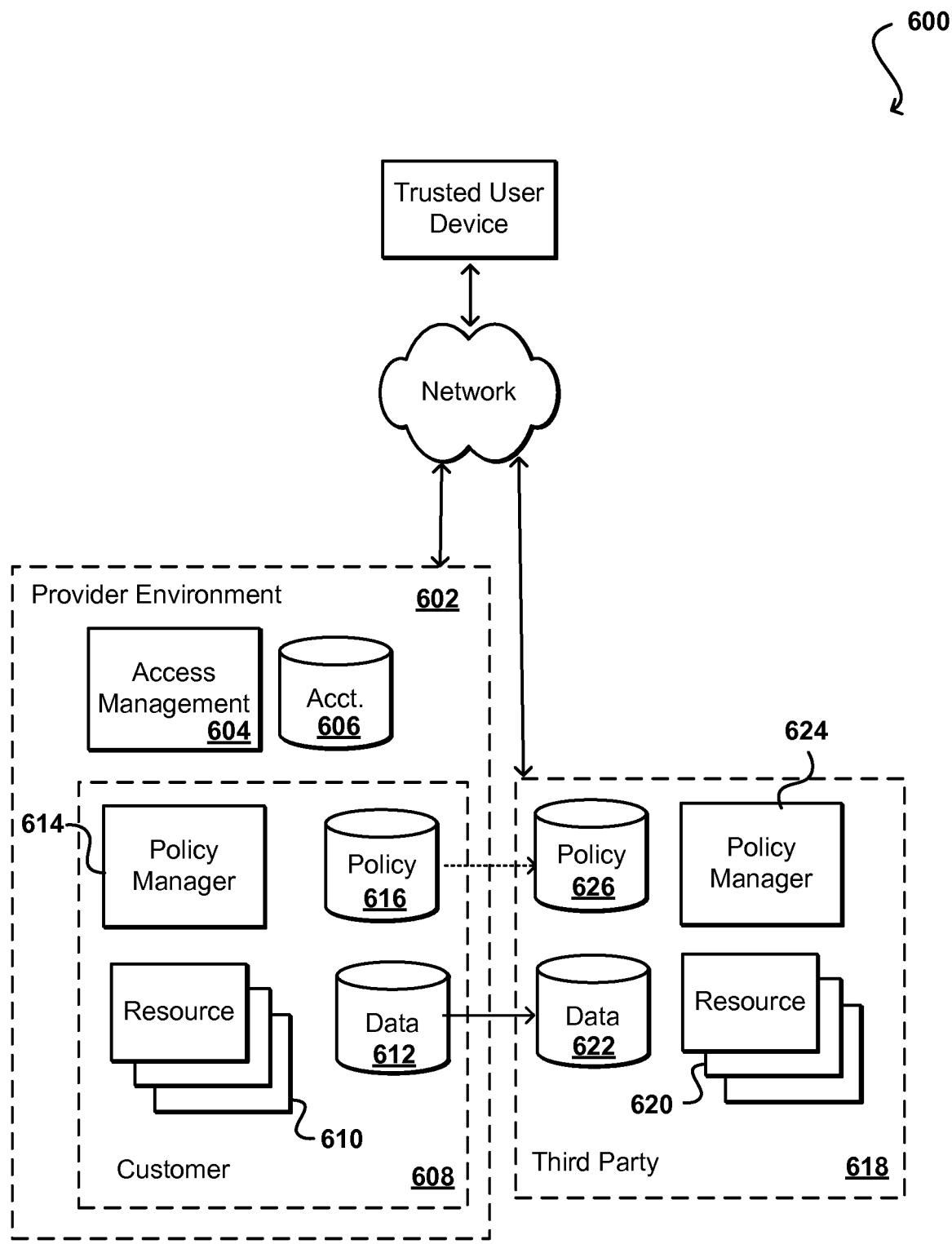
FIG. 6 illustrates an example configuration wherein a data object is to be transmitted across a trust boundary at the edge of a provider environment that can be utilized in accordance with various embodiments.

FIG. 6 illustrates yet another example environment 600 in which aspects of the various embodiments can be implemented and/or practiced. This configuration is somewhat similar to that of FIG. 4, except that in this case the second environment 618 associated with a second legal entity is also outside the provider environment 602. The first environment 608 for the first legal entity, a customer of the resource provider environment, is within the provider environment, such that the resources 610, data stores 612, policy manager 614, and/or policy repository 616 can still leverage the access management component 604, account repository 606, and other components, systems, and services of the provider environment. Because the second environment is a third party environment 618, provided by the second legal entity or another provider, the second environment can have its own resources 620, data stores 622, policy manager 624, and policy repository 626, among other such components.

Figure 7:
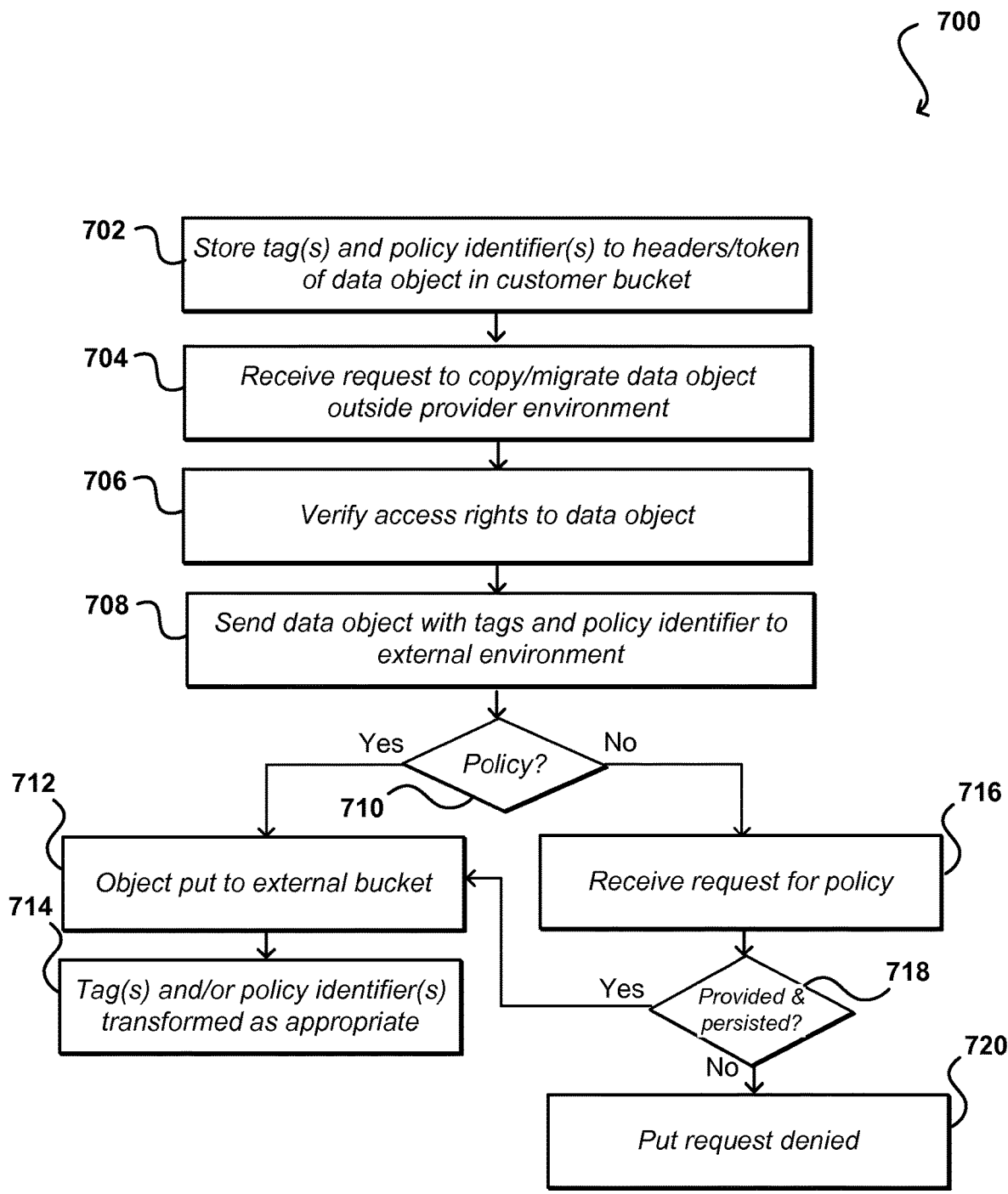
FIG. 7 illustrates a process for transmitting a data object across a trust boundary at the edge of a provider environment that can be utilized in accordance with various embodiments.

The approach will be similar to that described with respect to FIG. 5. In the example process 700 illustrated in FIG. 7, the data object with associated tags and policy identifiers is stored 702 in a customer bucket in the first environment. When a request to copy, migrate, or otherwise transmit the data object to the external, second environment is received 704, the access rights for the external entity can be verified 706. Assuming access is granted, the data object can be sent 708 with the tags and policy identifier to the external environment. A determination can be made 710 as to whether the external environment has the necessary policies and other aspects needed to enforce the policies in the second environment. If so, the object can be put 712 to a second bucket in the external environment and the tags and/or policies transformed as/if appropriate. If the external environment does not have all policies listed for the object, such as in a digest, a request can be received 716 for the missing policy from the external environment. If the policy is provided 718 and the external environment is able to persist and enforce the policy, then the data object can be stored to the second bucket or other location within the external environment. If the second environment is not able to enforce all policies of the data object, the transmission or put call can be denied 720. As mentioned, the data object might have a digest of N policies that apply, which can be encoded into a specific digest value. The external entity with the appropriate permissions can call into the first environment to determine how to interpret the digest value. In some embodiments the digest value is an identifier to a specific set of policies. In some embodiments the digest can be canonicalized, such as to sort the headers alphabetically before digesting them. If the second environment is missing some dependencies, the missing dependencies can be inserted into the second environment. Alternatively, the second environment could determine the missing dependencies, issue a GET request for the dependencies to avail them to the destination bucket before storing the data object to the destination bucket.

As mentioned, approaches in accordance with various embodiments can perform one or more translations of a policy document. In at least some embodiments an environment can include one or more translation engines that are configured to translate a policy, written using a particular version or representation of a policy language, to a representation written in an original representation of the policy language, such as the first version or representation supported in the environment. In other embodiments, the environment can determine the most recent version or representation that is supported across the environment, and can convert the security policy to be expressed using that version or representation. In still other embodiments, the policy might be converted into multiple versions or representations, which can be distributed for engines capable of supporting those versions or representations. Various other such approaches can be utilized as well.

Using such an approach, various policy document languages can be translated into at least one document language that is supported across the distributed environment. The translation can be performed in at least some embodiments for any representation where the features are able to be supported using an earlier language version or representation, even though the constructs might be significantly more complex after translation. Such an approach enables the distributed system to support incremental changes to a policy language, and in at least some embodiments can perform the translation at approximately the time of submission. Translating a policy document can also allow legacy components in the device to continue to interoperate. Such an approach differs from version control, for example, as the policies are converted to a specific representation that is supported across the environment, which in many cases will not be the most recent version or representation. Further, the translation can be performed around the time of policy submission, as opposed to runtime as for conventional versioning approaches. Further still, updated evaluation engines do not need to be deployed to every part of the distributed environment as with conventional versioning approaches. In at least some embodiments, however, the access management service might not be able to translate one or more features supported by the new representation, such that an updated translation engine might need to be propagated out to various locations across the distributed environment. The document created through the translation might be significantly larger than the received policy document, or might only allow for a subset of the access granted through the received policy document. In some embodiments, the received document can include annotations, metadata, or other information indicating one or more guidelines or instructions for translating the document to an earlier or different representation.

Figure 8:
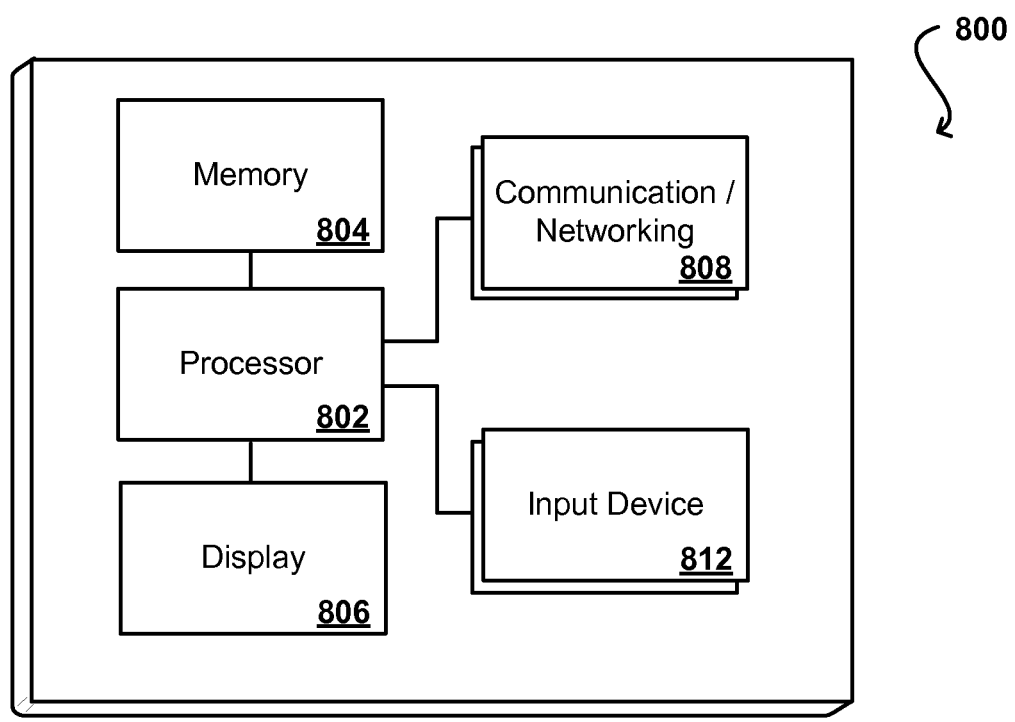
FIG. 8 illustrates a set of components of an example computing device that can be utilized in accordance with various embodiments.

FIG. 8 illustrates a logical arrangement of a set of general components of an example computing device 800 that can be utilized in accordance with various embodiments. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device may include, or be connected to, a display element 806, such as a touch screen or liquid crystal display (LCD), although devices might convey information via other means, such as through audio speakers. In some embodiments, the computing device 800 can include one or more communication components 808, such as a network interface card, Wi-Fi, Bluetooth, RF, wired, or wireless communication system. The device in many embodiments can communicate with a network, such as the Internet, and may be able to communicate with other such devices. In some embodiments the device can include at least one additional input element 810 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

Example environments discussed herein for implementing aspects in accordance with various embodiments are primarily Web-based, as relate to Web services and cloud computing, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

It should be understood that there can be several application servers, layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server, and typically will include a non-transitory computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in the figures. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer-readable media for containing code, or portions of code, can include any appropriate non-transitory storage media known or used in the art, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    allocating a first set of resources accessible under a first account of an enterprise with a resource provider, the first set of resources selected from a plurality of resources of a resource provider environment;
    allocating a second set of resources accessible under a second account of the enterprise with the resource provider, the second set of resources having a separate set of access rights from the first set of resources;
    storing a set of policies to a policy repository, of the resource provider environment, associated with the first set of resources and the second set of resources;
    associating a first set of policies to the first account of the enterprise;
    associating a second set of policies to the second account of the enterprise;
    storing a data object in the first set of resources, the data object including at least one data tag and at least one policy identifier, the at least one data tag indicating at least one categorization for the data object, the categorization based at least in part upon an aspect of data contained within the data object independent of the at least one data tag and at least one policy identifier, the at least one policy identifier indicating at least one applicable policy for the data object from the first set of policies;
    receiving a request to transmit a copy of the data object from the first set of resources to the second set of resources;
    determining that the second account of the enterprise has permission to access the at least one applicable policy for the data object from the first set of policies, the determination based at least in part upon the at least one policy identifier;
    transmitting the copy of the data object to the second set of resources, the copy of the data object including the at least one tag and the at least one policy identifier;
    updating the at least one tag or the at least one policy identifier included in the data object to correspond to the second set of resources; and
    enabling the second set of resources to access the at least one applicable policy for the data object from the first set of policies from the policy repository, per the at least one tag and the at least one policy identifier, wherein the second set of resources enforces the at least one applicable policy for the data object from the first set of policies in the second set of resources.

2. The computer-implemented method of claim 1, wherein the at least one applicable policy includes at least one access control policy.

3. The computer-implemented method of claim 1, further comprising:
    writing the at least one tag and the at least one policy identifier to a digest; and
    embedding the digest in a header of the data object, wherein the second set of resources is enabled to compare the at least one tag and the at least one policy identifier written to the digest to the at least one tag and the at least one policy identifier in the digest to verify that no modification to the at least one tag and the at least one policy identifier occurred during the transmitting.

4. The computer-implemented method of claim 3, further comprising:
    writing the at least one tag, the at least one policy identifier, and the digest to an opaque token embedded in the header of the data object.

5. The computer-implemented method of claim 1, further comprising:
    transforming at least one of the at least one tag or the at least one policy identifier in the second set of resources.

6. A computer-implemented method, comprising:
    storing a data object to a first environment associated with a first set of policies, the data object including at least one data tag and an identifier for at least one policy to be enforced for the data object from the first set of policies, the at least one data tag indicating at least one categorization for the data object, the categorization based at least in part upon an aspect of data contained within the data object independent of the at least one data tag and the identifier;
    receiving a request to transmit the data object to a second environment associated with a second set of policies, the second environment having second access rights different from first access rights for the first environment;
    determining that the second environment has permission to access the at least one policy for the data object from the first set of policies, the determination based at least in part upon the identifier for at least one policy to be enforced for the data object from the first set of policies;

determining that the second access rights for the second environment include access rights to receive the data object, the access rights granted in exchange for a guarantee that policies of the first environment will be enforced in the second environment;

updating the at least one tag or the at least one policy identifier included in the data object to correspond to the second set of resources; and transmitting the data object to the second environment, wherein the second environment is enabled to determine the at least one data tag and the identifier for the at least one policy and enforce the at least one policy for the data object from the first set of policies in the second environment.

7. The computer-implemented method of claim 6, wherein the first environment and the second environment are associated with different accounts for a common enterprise in a resource provider environment, and further comprising:

accessing the at least one policy for the data object from the first set of policies from a shared policy repository for the common enterprise.

8. The computer-implemented method of claim 7, wherein the at least one policy for the data object from the first set of policies is associated with the common enterprise and not specifically allocated to any of the different accounts for the common enterprise.

9. The computer-implemented method of claim 6, wherein the first environment is associated with a first legal entity and the second environment is associated with a second legal entity, and further comprising:

causing a resource in the second environment to determine that the second environment is unable to enforce at least one policy associated with the data object according to the identifier included with the data object; and causing the resource in the second environment to deny storing of the data object to the second environment.

10. The computer-implemented method of claim 6, wherein the first environment is associated with a first legal entity and the second environment is associated with a second legal entity, and further comprising:

causing a resource in the second environment to determine that the second environment lacks a copy of a specified policy of the at least one policy for the data object from the first set of policies;

receiving from the resource a request for the specified policy; and providing the specified policy to the resource, wherein the second environment is enabled to enforce the specified policy for the data object in the second environment.

11. The computer-implemented method of claim 10, wherein the specified policy provided corresponds to at least one of a first version of the policy as originally received to the first environment or a second version of the policy as transformed within the second environment.

12. The computer-implemented method of claim 10, wherein the resource in the second environment is able to determine that the second environment lacks a copy of the specified policy by examining a list of tags and policies contained within a digest of the data object.

13. The computer-implemented method of claim 6, further comprising:

determining a conflict of at least one dependency of the at least one data tag and the identifier for the at least one policy with a dependency of the second environment; and transforming the at least one dependency to remove the conflict, wherein the second environment is enabled to enforce the at least one dependency for the data object.

14. The computer-implemented method of claim 6, wherein the at least one policy for the data object from the first set of policies includes at least one of a security policy, an access policy, or an authorization policy.

15. The computer-implemented method of claim 6, wherein the at least one policy for the data object from the first set of policies is capable of being applied to at least one of a bucket, a queue, a data store, a processing component, a server, or a virtual machine of the second environment.

16. A system, comprising:

a plurality of resources;

at least one processor; and memory storing instructions that, when executed by the at least one processor, cause the system to:

store a data object to a first environment associated with a first set of policies provided by the plurality of resources, the data object including at least one data tag and an identifier for at least one policy to be enforced for the data object from the first set of policies, the at least one data tag indicating at least one categorization for the data object, the categorization based at least in part upon an aspect of data contained within the data object independent of the at least one data tag and the identifier;

receive a request to transmit the data object to a second environment associated with a second set of policies, the second environment having second access rights different from first access rights for the first environment;

determine that the second environment has permission to access the at least one policy for the data object from the first set of policies, the determination based at least in part upon the identifier for at least one policy to be enforced for the data object from the first set of policies;

determine that the second access rights for the second environment include access rights to the data object;

update the at least one data tag or the at least one identifier included in the data object to correspond to the second environment; and transmit the data object to the second environment, wherein the second environment is enabled to determine the at least one data tag and the identifier for the at least one policy and enforce the at least one policy for the data object from the first set of policies in the second environment.

17. The system of claim 16, wherein the first environment and the second environment are associated with different accounts for a common enterprise and provided by the plurality of resources, and wherein the instructions when executed further cause the system to:

access the at least one policy for the data object from the first set of policies from a shared policy repository for the common enterprise.

18. The system of claim 16, wherein the first environment is associated with a first legal entity and the second environment is associated with a second legal entity, and wherein the instructions when executed further cause the system to:

cause a resource in the second environment to determine that the second environment is unable to enforce at least one policy associated with the data object according to the identifier included with the data object; and cause the resource in the second environment to deny storing of the data object to the second environment.

19. The system of claim 16, wherein the first environment is associated with a first legal entity and the second environment is associated with a second legal entity, and wherein the instructions when executed further cause the system to:
    cause a resource in the second environment to determine that the second environment lacks a copy of a specified policy of the at least one policy for the data object from the first set of policies;
    receive from the resource a request for the specified policy; and
    provide the specified policy to the resource, wherein the second environment is enabled to enforce the specified policy for the data object in the second environment.

20. The system of claim 16, wherein the instructions when executed further cause the system to:
    determine a conflict of at least one dependency of the at least one data tag and the identifier for the at least one policy with a dependency of the second environment; and
    transform the at least one dependency to remove the conflict, wherein the second environment is enabled to enforce the at least one dependency for the data object.

* * * * *